United States Patent [19]
Gopal et al.

[11] Patent Number: 5,539,882
[45] Date of Patent: Jul. 23, 1996

[54] METHOD AND SYSTEM FOR AN EFFICIENT MULTIPLE ACCESS POLLING PROTOCOL FOR INTERACTIVE COMMUNICATION

[75] Inventors: Inder S. Gopal, New York; Roch A. Guerin, Yorktown Heights; Kumar N. Sivarajan, Croton-on-Hudson, all of N.Y.

[73] Assignee: International Business Machines Corporation, Armonk, N.Y.

[21] Appl. No.: 372,867

[22] Filed: Jan. 13, 1995

Related U.S. Application Data

[63] Continuation of Ser. No. 995,467, Dec. 22, 1992, abandoned.

[51] Int. Cl.$^6$ .............. G06F 13/368; H04L 12/403
[52] U.S. Cl. .............. 395/200.10; 395/861; 340/825.08; 370/85.8
[58] Field of Search .............. 340/825.08, 825.06, 340/825.07, 825.5, 825.54; 370/79, 84, 85.1, 85.2, 85.8, 85.7, 94.1, 95.2; 395/200.05, 200.06, 200.09, 200.10, 835, 838, 860, 861; 455/5.1; 348/12

[56] References Cited

U.S. PATENT DOCUMENTS

| | | |
|---|---|---|
| 3,651,471 | 3/1972 | Haselwood et al. ............... 395/200.09 |
| 3,755,782 | 8/1973 | Haas et al. . |
| 3,803,491 | 4/1974 | Osborn ............... 340/825.54 |
| 4,209,840 | 6/1980 | Beradi et al. ............... 395/200.06 |
| 4,343,042 | 8/1982 | Schrock et al. ............... 455/5.1 |
| 4,598,363 | 7/1986 | Clark et al. ............... 395/835 |
| 4,689,619 | 8/1987 | O'Brien, Jr. . |
| 4,774,707 | 9/1988 | Raychaudhuri ............... 370/85.2 |
| 4,796,025 | 1/1989 | Farley et al. . |
| 4,829,297 | 5/1989 | Ilg et al. ............... 340/825.08 |
| 4,924,462 | 5/1990 | Sojka . |
| 4,940,974 | 7/1990 | Sojka . |
| 4,942,572 | 7/1990 | Picard . |
| 5,132,680 | 7/1992 | Pezuka et al. . |

OTHER PUBLICATIONS

J. D. Spragins, "Telecommunications: Protocols and Design," *Addison Wesley* (1990).

*Primary Examiner*—Alyssa H. Bowler
*Assistant Examiner*—Mark H. Rinehart
*Attorney, Agent, or Firm*—Ratner & Prestia

[57] ABSTRACT

A polling procedure providing the capabilities to assign and dynamically modify a user's communication parameters (i.e., response allocation and polling rate) based on the user's bandwidth requirements. In addition, the polling procedure instructs the users to delay their responses as a function of round-trip propagation delay and remaining response allocation for previously polled users to ensure that poll responses from separate users do not overlap.

12 Claims, 9 Drawing Sheets

(DOTTED LINE INDICATES THAT USER 1 WAITS AN AMOUNT OF TIME TO MAKE IT APPEAR TO HAVE THE SAME PROPAGATION DELAY AS USER 2.)

METHOD AND SYSTEM FOR AN EFFICIENT MULTIPLE ACCESS POLLING PROTOCOL FOR INTERACTIVE COMMUNICATION

This application is a continuation of U.S. application Ser. No. 07/995,467, filed Dec. 22, 1992, which is now abandoned.

FIELD OF THE INVENTION

The present invention relates generally to a multiple access polling protocol for interactive communication and, more particularly, to a multiple access polling protocol for interactive communication which assigns and dynamically varies polling rates and response size allocations of users based on their bandwidth requirements.

BACKGROUND OF THE INVENTION

A. Generally

In communication networks such as cable television systems, it is often desirable to access information from individual subscriber terminals coupled to the network. For example, in a typical two-way cable television system, each subscriber is provided with an addressable converter that enables the selective reception of authorized television programs. Recent advances in the CATV industry have enabled the provision of pay-per-view services, wherein the cable television customer has an opportunity to select specific programs such as first-run movies. The information provided by the user station in this type of setup is limited.

However, other features available on CATV systems including shop-at-home, bank-at-home, viewer opinion polling, home multimedia PC applications and video conferencing require that the user station be more active in communicating with a communication control center. To be useful, a communications protocol selected for use with a CATV system wherein the user station's communication needs are variable desirably provides for efficient use of the available resources (e.g., data transmission bandwidth). Moreover, the system should desirably be upgradable if more bandwidth is available and/or the maximum bandwidth required by the user increases (e.g., HDTV).

Different applications require different bandwidth and delay requirements. Voice requires approximately 56–64 kilobits-per-second (kbps) for telephone quality but higher quality may require as much as 256 kbps. A video signal compressed using the MPEG-1 standard requires about 1.5 Megabits-per-second (Mbps) and other compression schemes that provide a higher quality video signal may require as much as 5–9 Mbps. HDTV quality requires approximately 20 Mbps.

Bandwidth requirements for data vary over a wide range. An application providing stock quotes may have a low bandwidth requirement (kbps) while the transfer of files over the network may require a much higher bandwidth.

In addition, while voice and video have stringent real-time delivery requirements, data usually does not. For example, a bandwidth of 1.5 Mbps can be provided by allowing the user station to send a packet of size 1.5 kilobits every millisecond or a packet of size 1.5 Megabits every second. While the latter may be acceptable in the case of a file transfer application, it would not be acceptable for a video conference where smaller packets have to be sent more frequently.

In an interactive environment, a user's bandwidth requirement may vary during a connection. For example, a user could be in the middle of a voice call and may want to add video to the call. This could cause his bandwidth requirement to go up, for example, from 250 kbps to 5 Mbps which, in turn, may cause the user station to change from sending 5 kilobit packets every 20 ms to sending 20 kilobit packets every 4 ms.

As mentioned, a solution to efficiently sharing available bandwidth needs to take into consideration the potential of users with varying bandwidth requirements. Current methods such as systems employing frequency division multiple access (FDMA) or time division multiple access (TDMA) can only allocate in multiples of a predetermined minimum frequency band or time slot, respectively. Moreover, TDMA requires all the users to have time synchronization, which adds complexity to the system. This is inefficient in the case of applications with variable bandwidth requirements.

B. Background Regarding CATV Topology

FIG. 1 shows a typical CATV system comprising at least one headend 102 connected to a plurality of hubs 104a–d interconnected in a star-like topology. The connections between hubs 104a–d are provided for redundancy purposes. The above connections have been either by coaxial cables (coax), microwave links or optical fibers, although optical fibers are expected to be the medium of the future.

Emanating from each hub 104a are trunks 106 (typically 40–50) which serve a group of homes. Although current trunks are typically coaxial cables, they too are being replaced by optical fibers. Optical fiber trunks terminate at an optical node 108 which receives the optical signal, converts it to a coax compatible signal and transmits it to the homes.

Replacing much of the interconnections with optical fibers will likely increase the bandwidth available on the coax from approximately 300–400 MHz to 1 GHz. This will enable the provision of a few hundred digital PPV channels and interactive services like video-conferencing and home shopping in addition to the usual cable channels.

SUMMARY OF THE INVENTION

The present invention involves a polling method and system for providing access to a shared communications medium by multiple users coupled to a remote station. Each user is assigned a polling rate and a predetermined response size. Then, a polling signal is transmitted from the remote station to each user station the assigned polling rate. Then, a response is transmitted from each user station no greater in size than the predetermined response size after receiving the polling signal.

BRIEF DESCRIPTION OF THE DRAWINGS

The invention is best understood from the following detailed description when read in connection with the accompanying drawings, in which.

DETAILED DESCRIPTION OF THE INVENTION

I. Overview

The polling procedure of the present invention provides the capabilities to dynamically modify a user's communication parameters, i.e., response size allocation (packet size) and polling rate, based on bandwidth requirements. Additionally, the polling procedure ensures that poll responses from separate users do not overlap.

It should be noted that, although the polling procedure is described with reference to a CATV network, it is not limited to a CATV network.

Figure 3:
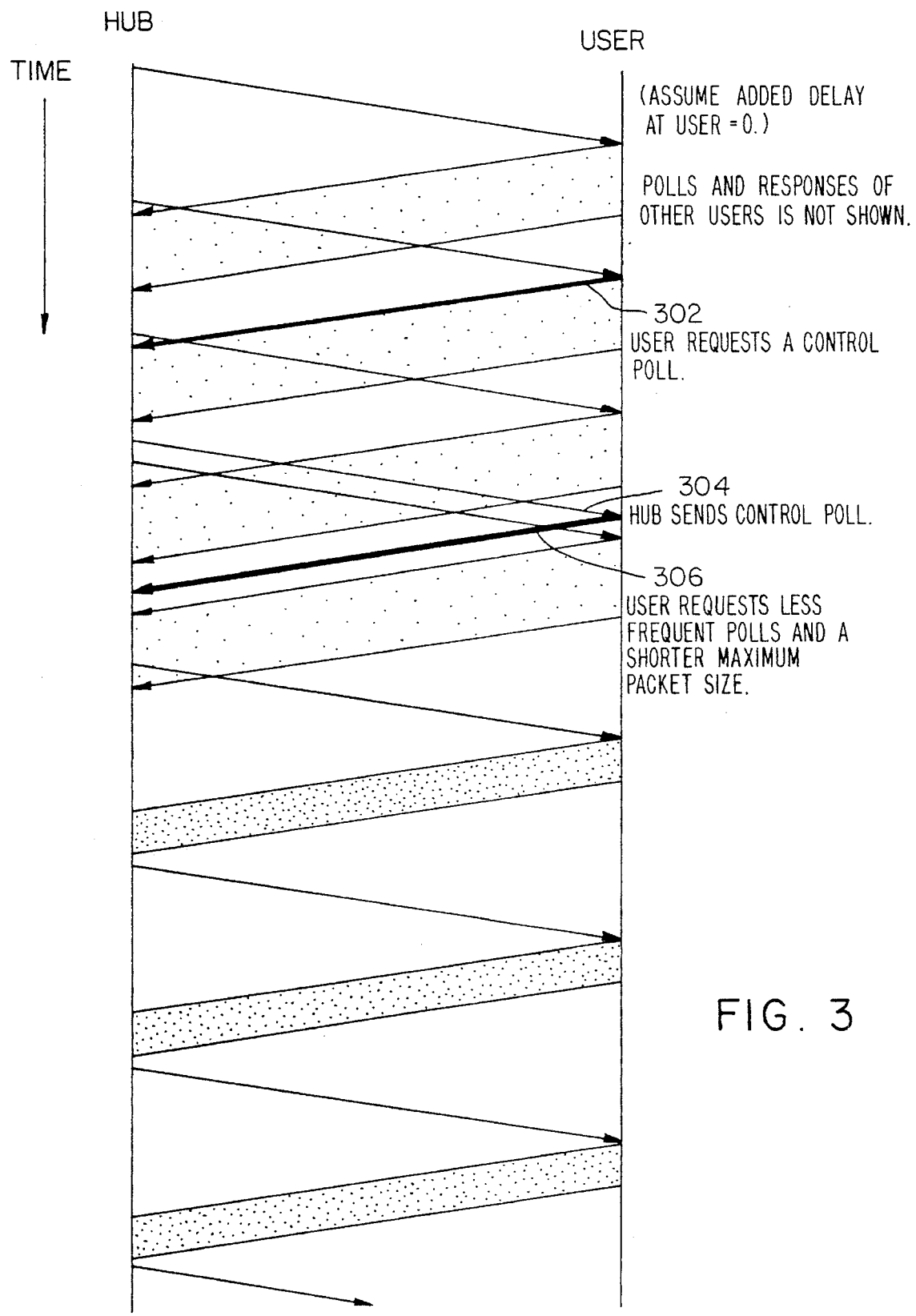
FIG. 3 is a timing diagram illustrating the aspect of the present invention which provides for dynamically varying polling rate and response size allocation.

FIG. 3 illustrates, by way of example, the capability of a hub and a user to renegotiate the parameters of their communication connection (e.g., response size allocation and polling rate). In FIG. 3, the hub and the user have defined communication parameters which are initially determined when a connection is made. Once the user becomes active (i.e., hub sending data polls and user responding with data), a user desiring to modify either or both of its communication parameters, requests a control poll from the hub, step 302.

The hub sends the control poll, step 304, which allows the user to respond with a request for modification (e.g., less frequent polls and reduced response size allocation), step 306. Upon receipt of the request, the hub modifies the polls and their rate accordingly. Subsequent polling and responding between the hub and the user is conducted using the modified parameters, as represented by the transition from the gray shaded areas to the black shaded areas in FIG. 3.

The capability to assign and renegotiate the communication parameters provides an efficient and flexible polling protocol for multiple access interactive communications. This is especially advantageous when the communication parameters vary from one connection to the next or when they vary during a given connection.

Figure 4A:
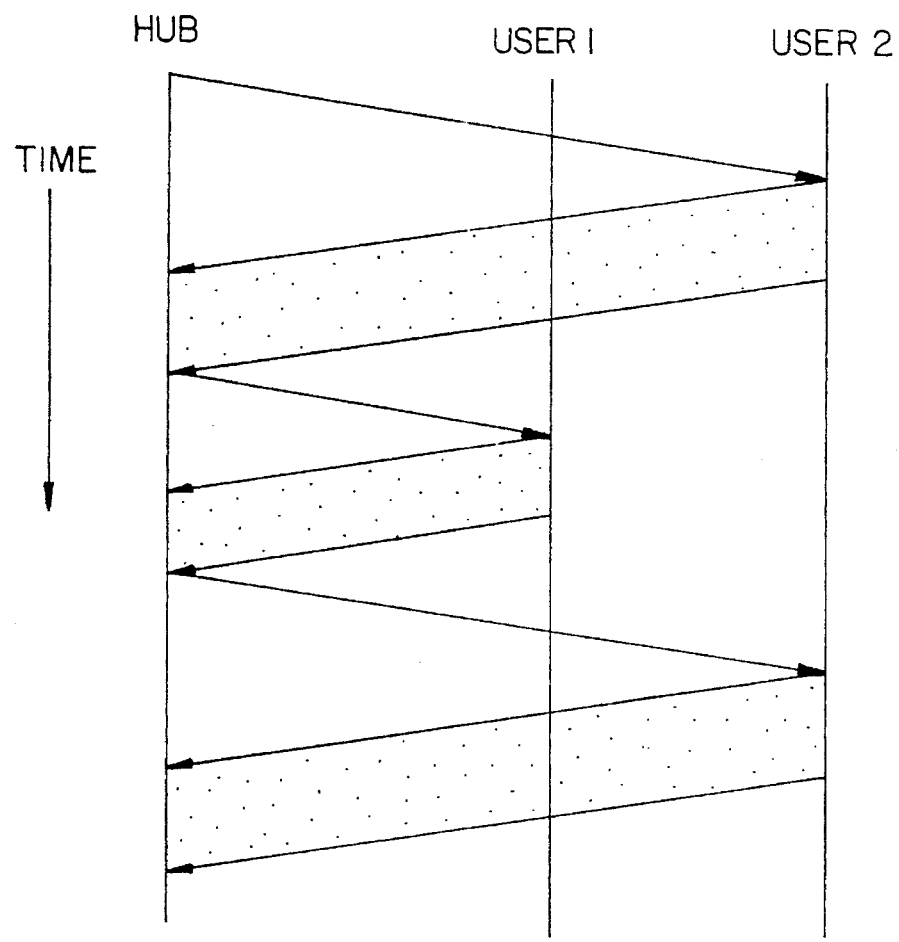
FIGS. 4a–4b are timing diagrams which illustrate the impact of propagation delay on the efficiency of polling.

Another aspect of the polling procedure ensures that responses by separate users do not overlap. This capability is illustrated, by way of example, in FIGS. 4a–4d. In FIG. 4a, a hub communicating with two users employs a polling procedure in which the users respond immediately upon receipt of a poll (delay of user processing assumed to be insignificant) and the hub waits for receipt of the response from the last poll before sending out the next poll. As seen in FIG. 4a, the hub and the users remain idle during the time it takes for polls and/or data to propagate.

Figure 4B:
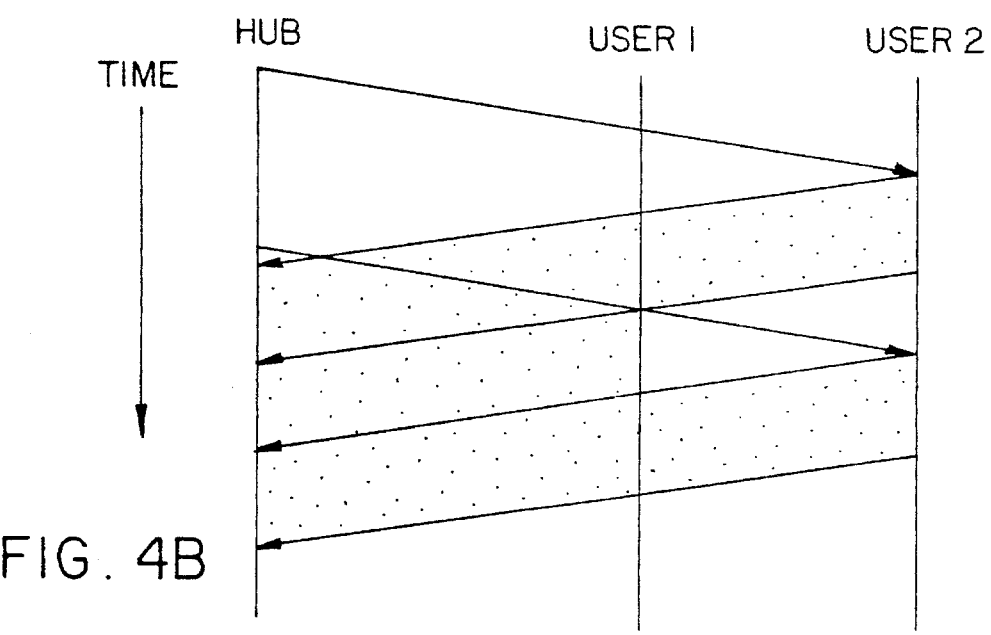

FIG. 4b illustrates, by way of example, the timing of a polling procedure capable of maximizing the use of bandwidth such that the hub is almost always receiving data. In this procedure, the hub schedules the polls such that when the users respond immediately upon receipt of the polls, the timing is such that idle time is minimized.

Figure 4C:
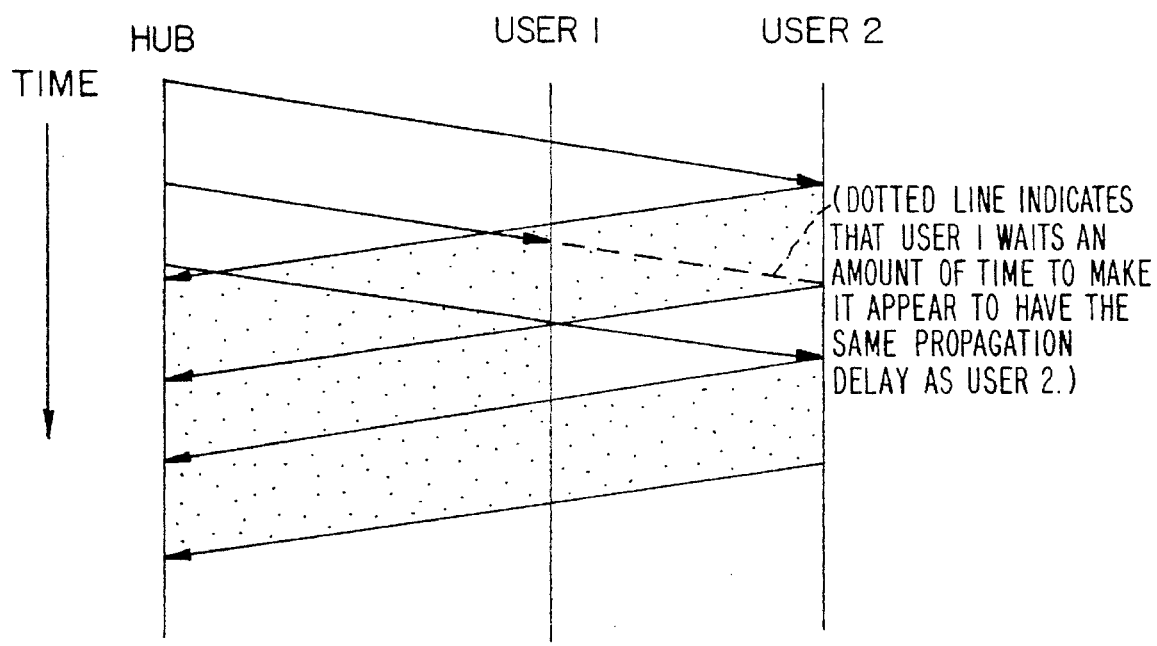
FIGS. 4c–4d are timing diagrams which illustrate the aspect of the present invention which provides for efficient non-overlapping responses.

In contrast, FIG. 4c illustrates, by way of example, the timing of a polling procedure also capable of maximizing the use of bandwidth such that the hub is almost always receiving data. In this procedure, the hub schedules the polls according to the maximum response size allocation for previous users while the users are instructed to suitably delay their responses so they appear equidistant from the hub.

Figure 4D:
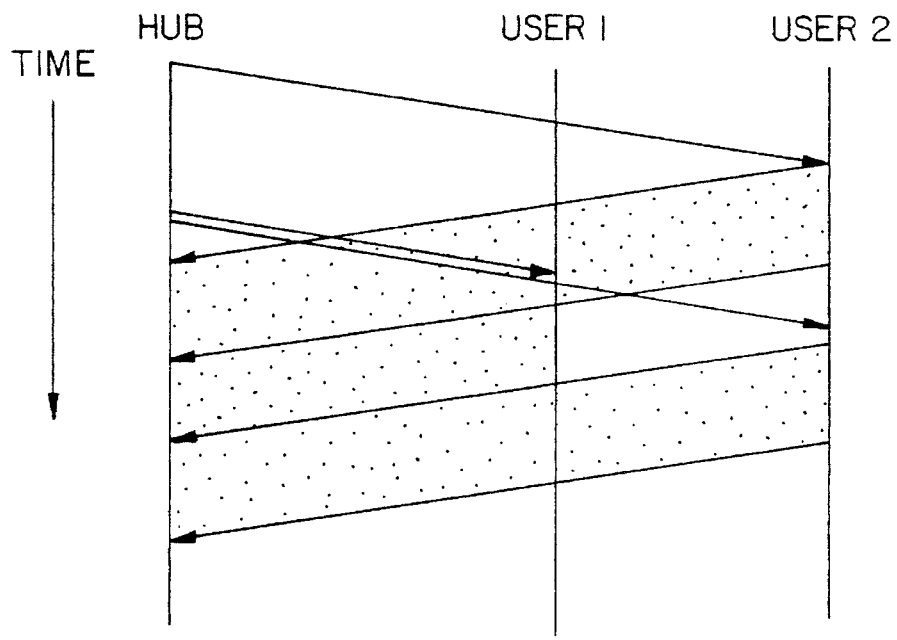

Similar to the procedure of FIG. 4c, FIG. 4d illustrates, by way of example, the timing of a polling procedure also capable of maximizing the use of bandwidth such that the hub is almost always receiving data. In this procedure, the hub rather than scheduling the polls itself instructs the users to delay transmission by some value which is a function of the sum of the remainder of maximum response size allocations for previously polled users and the maximum round-trip propagation delay.

Figure 4E:
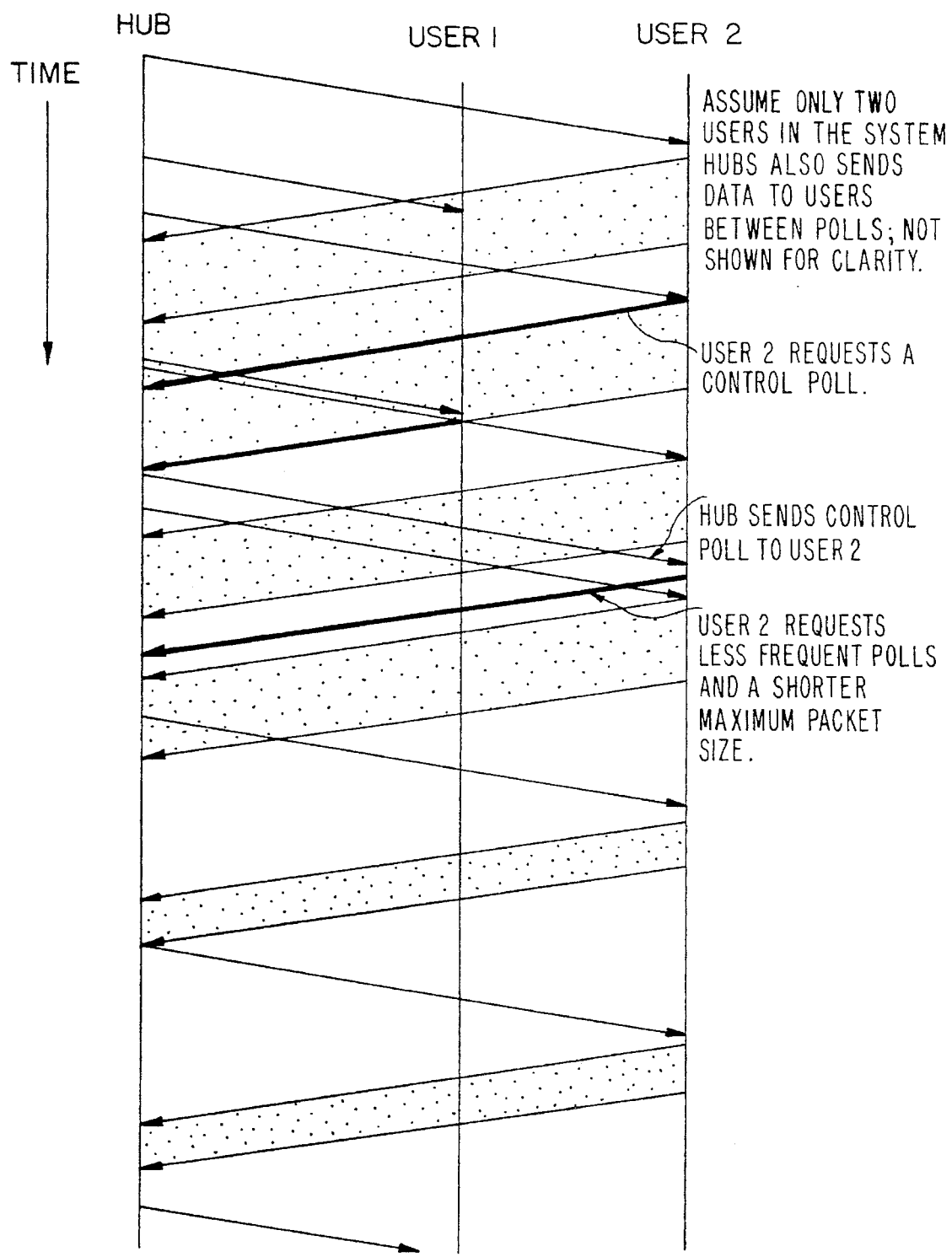
FIG. 4e is a timing diagram which illustrates the integration of the aspects featured in FIG. 3 and FIGS. 4c–d.

To summarize, in the present invention, more efficient polling is provided by varying the communication parameters and ensuring no overlap of responses by delaying poll responses from users for a certain period of time. The above combination of features is illustrated, by way of example, in FIG. 4e.

The delay time is based on a known maximum round-trip propagation delay as well as the maximum response size allocated for the previously polled users. In this way, the hub can send out successive polls without waiting for a response because the user stations have been instructed to delay a sufficient amount of time to allow a previously polled user station to finish its response.

II. Detailed Description of the Exemplary Embodiment

As mentioned, the polling procedure of the present invention provides the capabilities to assign and dynamically modify a user station's maximum packet-size allocation and to dynamically modify the rate at which each user is polled. And, in addition, the polling procedure ensures that poll responses from separate users do not overlap.

A. Polls

In the exemplary embodiment of the present invention, there are two kinds of polls—data polls and control polls. Although the general format of the polls is the same, a field within the poll indicates whether the poll is a data poll or control poll.

Figure 5:
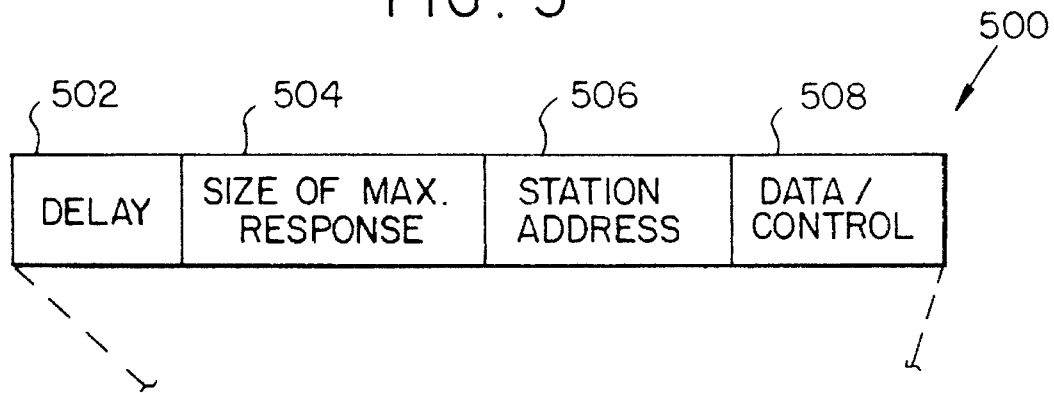
FIG. 5 shows the format of a poll suitable for use with the present invention.

FIG. 5 shows the format of a poll 500. As shown, the poll format has four fields: (1) delay 502, (2) size of max. response 504, (3) station address 506 and (4) data/control indicator 508. It should be noted that other fields could be added to the poll format for the purpose of performing other functions not specified herein.

The delay field 502 indicates to the user the amount of time that the user should wait from the time it receives the poll to the time it sends its response. Although this delay is initially calculated from a knowledge of the round-trip propagation delay between the user and the hub, if necessary, the round-trip propagation delay can be remeasured at periodic intervals to account for variations (e.g., weather).

In equation form, the delay field 502 equals $D_i$ where $D_i$ is chosen to be larger than the sum of three quantities:

(1) the maximum round-trip propagation delay from any user to the hub, (2) the delay encountered in the poll-FIFO of the hub, described below with reference to FIG. 7, (3) the delay encountered in the poll-FIFO of the user set-top box, described below with reference to FIG. 8.

The delay fields of the various users are chosen so as to minimize the dead-time between responses on the upstream channel while ensuring that these responses do not overlap. This is discussed below in further detail in the Theory of Operation section.

The size of max. response field 504 indicates to the user the maximum length of the response that can be sent in response to the poll. In the exemplary embodiment, for data polls, this is initially specified at the time of connection setup; however, for control polls, this is the maximum size of any control message and is fixed at the time of system design. Furthermore, responses are in the form of packets of data.

Figure 2:
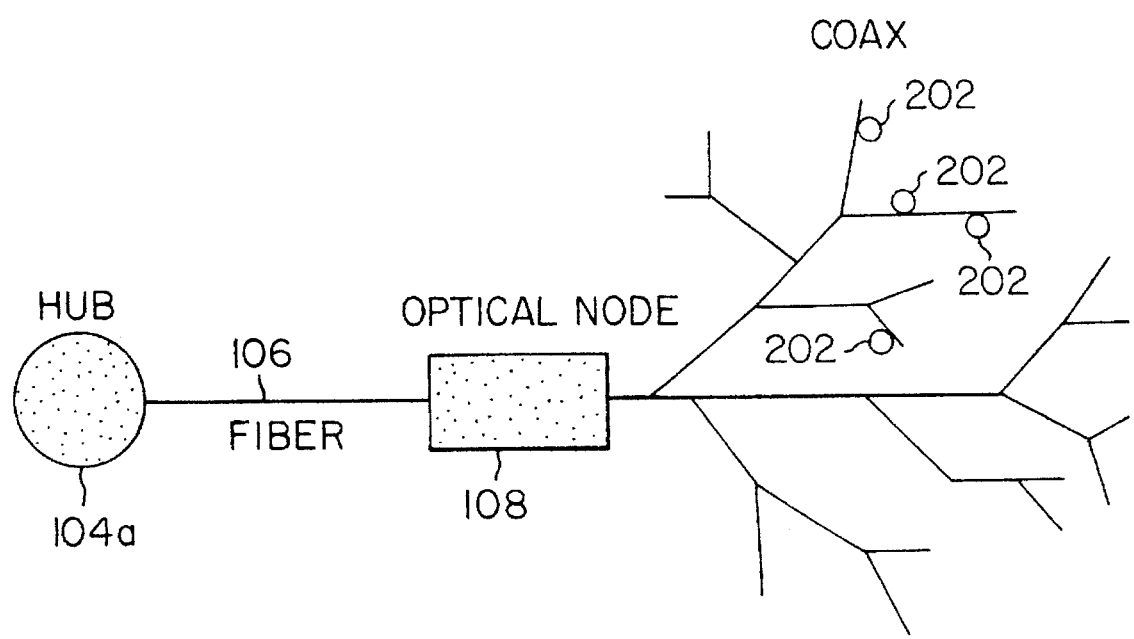
FIG. 2 shows a segment of FIG. 1 focusing on the hub, the optical node and the associated tree network.

The station address field 506 is the address of the user within the network. For example, referring to the tree network of FIG. 2, each user 202 has a separate address and is analogous to a leaf on the tree; however, this procedure is not limited to a tree topology. Other topologies suitable for use with the present invention include a ring, a bus, a star, or the like.

The data/control field 508, as mentioned above, indicates to the user whether the poll is a data poll or a control poll.

In the case of active users, control polls are the preferred vehicle for renegotiating the communication parameters. And, in the exemplary embodiment, a field in the header of the data packet sent by a user in response to a data poll requests that the hub send the user a control poll for the purpose of renegotiation (see FIG. 3).

All users receive control polls at a predetermined low frequency while they are idle for the purpose of setting up a connection. And, in the exemplary embodiment, a connection release (or disconnect request) can be effected by sending an appropriate control packet in response to a data poll (when there is no more data to be sent).

B. Poll Table and Poll Generation

In the exemplary embodiment of the present invention, available bandwidth is divided into two types of channels: one for upstream communication (i.e., user to hub) and one for downstream communication (i.e., hub to user). Although a polling table is maintained for every upstream channel, the following description, for purposes of illustration, focuses on the case of a single upstream channel.

Figure 6:
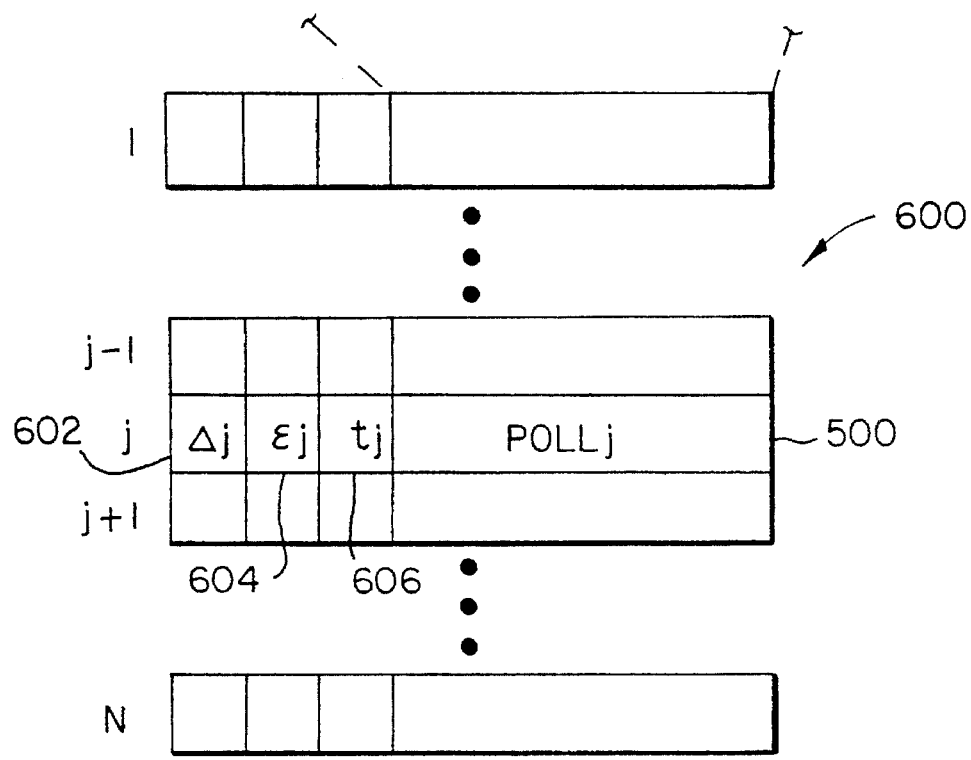
FIG. 6 shows the format of a polling table for storing the polls of FIG. 5 suitable for use with the present invention.

FIG. 6 shows the format of a polling table 600 suitable for use with the present invention. At least one contemplated alternative to the polling "table" would be to store pointers to memory locations containing the table entries.

As shown in FIG. 6, every table entry contains four fields (note that $\delta$ is the time interval between reading two successive entries from polling table 600):

(1) $\Delta j$ 602, the time between polls for that connection (if the user is active, this time interval is specified at the time of the connection request; if the user is idle, it is a predetermined time interval for idle users), (2) $\epsilon j$ 604, where $\epsilon j \delta$ is the adjustment in the time to the next poll needed to compensate for the accumulated error in the polling time, (3) $t_j$ 606, the time at which $Poll_j$ is to be read from the polling table in units of $\delta$, and (4) $Poll_j$ 500, the poll itself.

For every station, there is an entry in polling table 600. This entry is replaced every time a poll is sent to that station. Some of the parameters of the entry, e.g., the time to the next poll $\Delta$, are changed in response to control messages from the station, e.g., connection requests and disconnects.

Upon reading a non-empty row (a valid entry), the entry is copied into the poll-FIFO (see FIG. 8), removed from this row of polling table 600 and an attempt is made to create a new entry for that user $\Delta$ rows from the current row. A potential problem arises, however, if the row $\Delta$ rows away is occupied. In the exemplary embodiment of the present invention, the entry is placed in the next available row, thus, increasing the time between successive reads for this connection. One contemplated solution to compensate for the increase in time between successive reads is to decrease the time to the next poll.

An equation-oriented description of the reading, writing and updating of the polling table follows (where N is the number of rows in polling table 600 and the maximum time between two polls, $N\delta$, is the time between two successive polls to an idle station):

(1) Initialize the polling table with one entry for each station in the network, at some random position in the table. If this entry is in row i, set $t_i=t+i\delta$, $\Delta_i=N$ and $\epsilon_i=0$. Let $j=-1$.

(2) Let $j=j+1$.

(3) Check for a connection request and if one is present, delete the idle entry corresponding to that station from the polling table and add an entry with the parameters specified by the connection request at the first available row in the table, say i. Set $\epsilon_i=0$, $\Delta_i$ and $Poll_i$ can be obtained from the connection request.

(4) Check for requests for control polls and add an entry corresponding to it at the first available position in the table setting $\Delta=0$.

(5) Check for a disconnect request and replace the corresponding entry in the polling table by one with the parameters for an idle station.

(6) Check for bandwidth renegotiation messages. If there are any, delete the entry for that user and add an entry with the new parameters at the first available position. (In the exemplary embodiment, a bandwidth change request is treated as a simultaneous disconnect and connect.)

(7) If row j mod N in the polling table is empty, go to (2).

(8) Read row j mod N and send $Poll_j$ into the poll-FIFO (see FIG. 8); if this entry is a one-time only control poll (i.e., $\Delta=0$), delete this entry and go to (2).

(9) Let i=min(k:k≥j+1, k≥j+$\Delta j$−$\epsilon j$, entry k mod N in polling table is empty). Remove entry j in the polling table and replace it by an entry in row i mod N with the other fields of the entry given by $$\epsilon_i=\epsilon j-(i-j-\Delta j),$$

$$\Delta_i=\Delta j,$$

and $$t_i=t_j+(i-j)\delta.$$

(10) Go back to (2).

It should be noted that although a particular order for the above steps has been presented, the order may be varied if necessary to accomodate certain design objectives.

To further illustrate the above procedure, the following example is described:

Assume that there are two stations in the network which are both idle and that control polls are being sent to them periodically. Also assume that the process is at the top of the polling table and t=0.

A connection request is received from station 1 with A specified as 100$\delta$. The idle poll for station 1 is deleted and an entry is placed in row 0 of the polling table with the parameters ($Poll_0$, $\Delta_0=100$, $\epsilon_0=0$ and $t_0=0$).

After reading row 0 of the polling table, it is deleted and an entry with the parameters ($Poll_{100}=Poll_0, \ldots, t_{100}=100\delta$) is placed in row 100 (assuming row 100 is empty).

Now, upon checking for connection requests after having read row 9 of the polling table, a connection request from station 2 is detected. The $\Delta$ specified for this station is 90$\delta$.

The idle poll for station 2 is deleted and an entry is placed in the next available row—row 10—with the appropriate parameters (Poll$_{10}$, $\Delta_{10}$=90, $\epsilon_{10}$=0, $t_{10}$=10$\delta$).

After reading row 10 of the polling table, the entry is deleted and an attempt is made to place another entry in row 100 (10+90), but this row is occupied. The next available row is 101 and we put an entry in this row with the appropriate parameters (Poll$_{101}$=Poll$_{10}$, $\Delta_{101}$=$\Delta_{10}$=90, $\epsilon_{101}$=1, $t_{101}$=101$\delta$). Assuming no other control messages (e.g., disconnects, bandwidth change requests) are received, rows 11 through 99 remain empty.

After reading row 100, it is replaced by an entry at row 200 with the same parameters. After reading row 101, it is replaced by an entry in row 190 (101+$\Delta_{101}$-$\epsilon_{101}$=101+90-1=190) with the appropriate parameters (Poll$_{190}$=Poll$_{101}$, $\Delta_{190}$=$\Delta_{101}$=90, $\epsilon_{190}$=$\epsilon_{101}$+(190-101-90)=0, $t_{190}$=190$\delta$).

Assuming N=1024, continuing with the above process results in rows 200, 300, 400, 500, ... 1000, 76 (1100 mod N) containing polls for station 1 and rows 280, 370, 460, . . . 910, 1001, 66 (1090 mod 1024) containing polls for station 2.

By the procedure illustrated in the above example, polls are generated at a rate which meets the bandwidth requirements of the connection.

C. Hub and User Polling Apparatus

Figure 7:
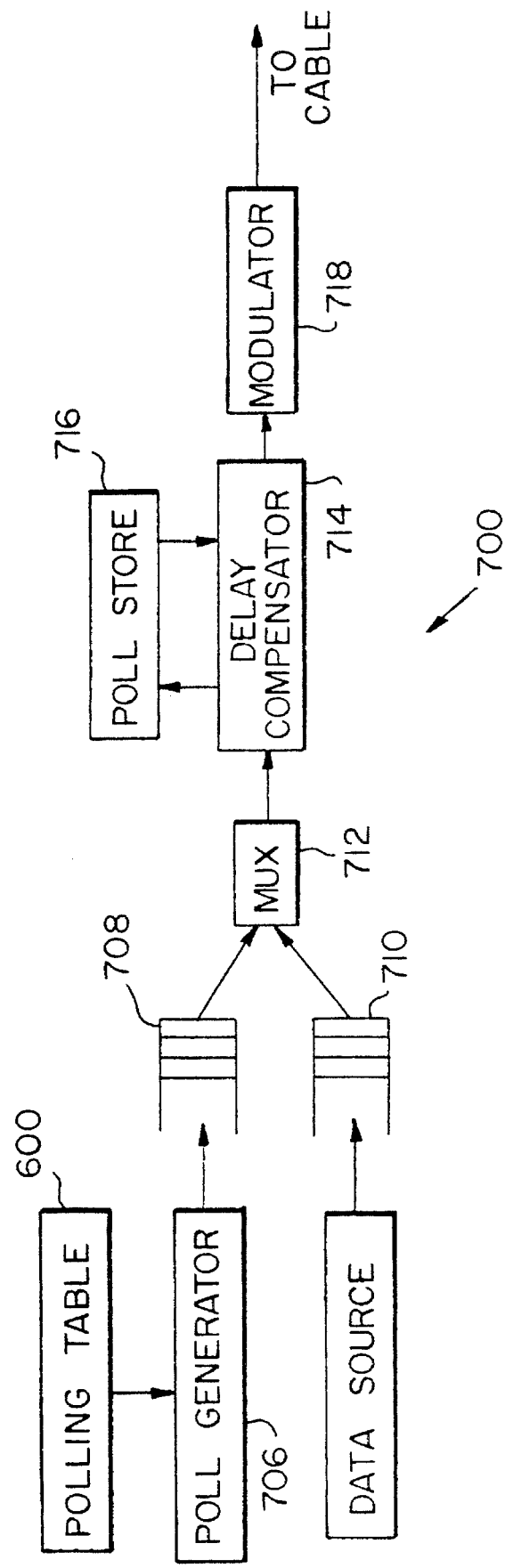
FIG. 7 is a functional block diagram of a hub polling apparatus suitable for use with the present invention.

FIG. 7 shows a polling apparatus 700 for the hub suitable for use with the present invention. It should be noted that, although this portion of the polling apparatus is shown in the hub, it could be located in the optical node. Additionally, communication between the hub and the headend (see FIG. 1) can be accomplished by suitable means well known in the art.

In FIG. 7, polling table 600 (described above) contains the entries associated with each connection, active and idle. Poll generator 706 reads the entries and places them in poll-FIFO 708. Polls from the poll-FIFO 708 along with data from the data-FIFO 710 are fed to multiplexer 712. The output of mux 712 is appropriately modified by delay compensator 714 which uses the output of poll store 716 (the details of the modification procedure are described below). The output of the delay compensator 714 is modulated by modulator 718 and transmitted along the cable.

Figure 8:
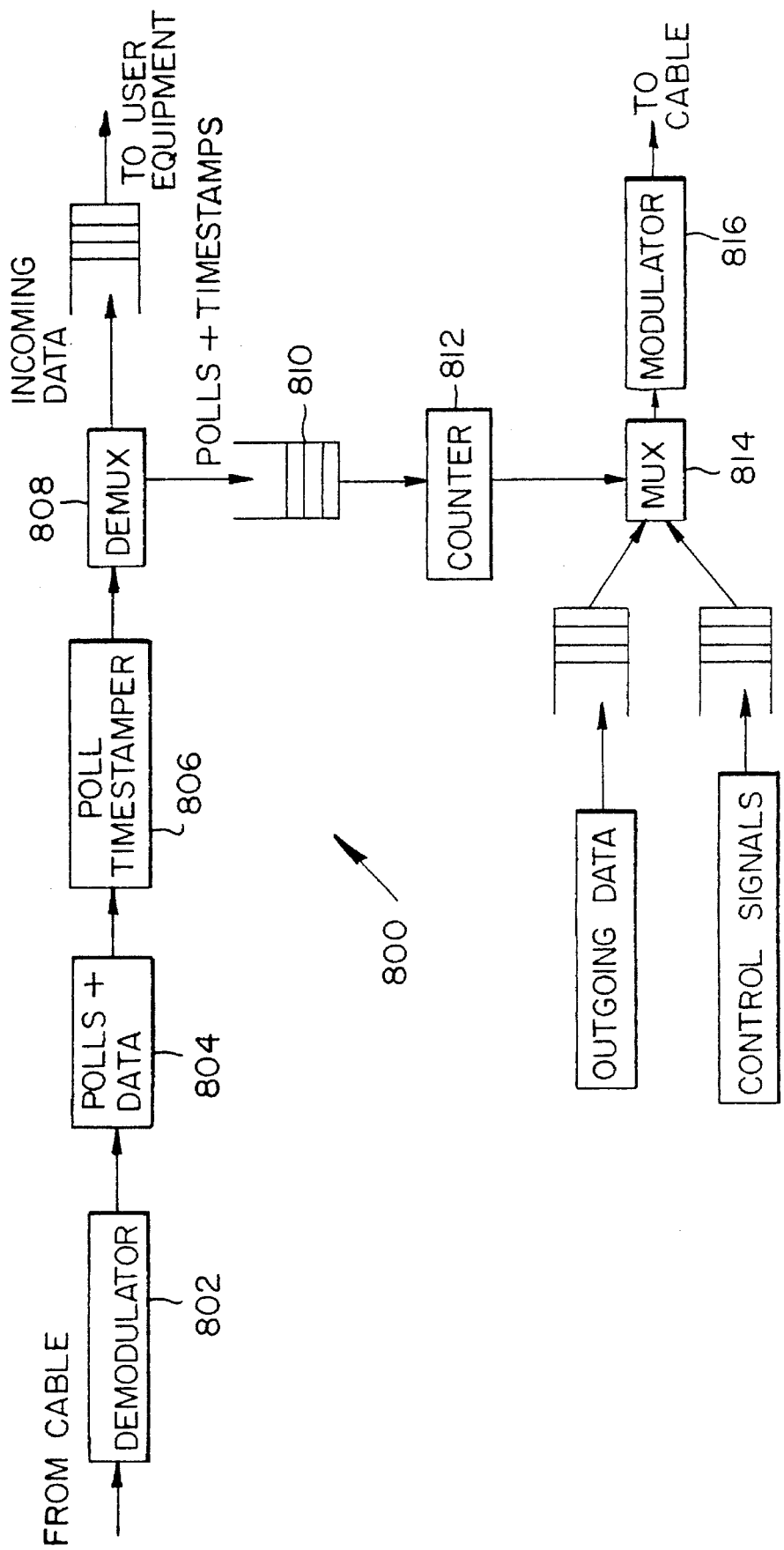
FIG. 8 is a functional block diagram of a user's set-top box polling apparatus suitable for use with the present invention.

At the other end of the cable, a polling apparatus 800, shown in FIG. 8, is used in the user's set-top box. The modulated data sent by apparatus 700 is first demodulated by demodulator 802. Next, the demodulated data is received, if the station address is recognized, and then identified as either polls or (user)-data, functional block 804. The polls are subsequently timestamped by timestamper 806. Next, using demultiplexer 808, the data is routed to the user equipment while the polls with timestamps are placed into poll-FIFO 810. Counter 812 reads the delay field of the poll and delays the transmission of outgoing data by the specified amount. The data to be sent is selected via multiplexer 814, then modulated by modulator 816 and sent back via the cable.

D. Delay Adjustments in the Polling Procedure

Referring back to FIG. 7, poll-FIFO 708 contains the polls along with the time that it was read from the table, $t_j$. One purpose of the $t_j$ is to be able to calculate the delay incurred by the poll while in poll-FIFO 708 where it waits to be transmitted. In the exemplary embodiment of the present invention, the polls have non-preemptive priority over data messages (i.e., if there is a poll waiting to be sent, no data packets are sent but a data packet in transmission is not interrupted in order to send a poll). Thus, if a poll is scheduled to be transmitted during a time that data is being sent, the poll is delayed in the poll-FIFO 708.

However, the delay incurred in poll-FIFO 708 is not the only factor used to ensure that responses to the polls do not overlap. An additional consideration is the maximum time allocated for responses to previously sent polls.

Responses to polls j and j+1 overlap if, for example, $t_j+p_j<t_{j+1}$, where $t_j$ and $t_{j+1}$ are the timestamps on polls j and j+1, respectively, and $p_j$ is the maximum size of the response to poll j. But in order to determine if responses to polls j and j+1 overlap, it is not always sufficient to consider the size of the response to poll j alone, it may be necessary to consider the size of the responses for the previous polls as well. The following procedure is used to compute the value by which the delay field of poll j should be increased, if any, in order to ensure that the responses to the polls do not overlap.

Let $t_0$ be the timestamp on the first poll and $p_0$ be the maximum size of the response to this poll. Initialize poll store 716 with the value $t_0+p_0$. Denote the value in poll store 716 by S. For $j \geq 1$, execute either of the following steps, according to whether $t_j \geq S$ or $t_j < S$:

If $t_j \geq S$, the increment to the delay field of poll j is zero. Replace S by $t_j+p_j$.

If $t_j < S$, the increment to the delay field of poll j is $S-t_j$. Increase S by $p_j$.

At the user polling apparatus of FIG. 8, each received poll is tagged with a timestamp recording the time of arrival, $t_k$, and put in poll-FIFO 810. When the poll reaches the head of poll-FIFO 810, the delay field is decremented by the time spent in poll-FIFO 810, $t-t_k$. The value of the delay field in the poll at the head of poll-FIFO 810 is loaded into a counter which is decremented (at clock speed) till it reaches zero. At this time, the response to the poll is transmitted and the poll is discarded.

E. Blocking Connection Requests

Since the system has a finite capacity, some connection requests may have to be denied. If the maximum packet size for connection i on the upstream channel is $P_1$ and the time between successive polls is $\Delta_i \delta$, the bandwidth requirement of the ith user on the upstream channel is $p_i/(T\Delta_i\delta)$ where 1/T is the clock speed. Assume the bandwidth requirement of the ith user on the downstream channel is $p_i'/(T\Delta_i\delta)$ and the length of a poll is $\pi$. Then, if the total usable bandwidth on the upstream and downstream channels is B, we must have $$\Sigma_i P_i/(T\Delta_i\delta) < B \qquad (U)$$

$$\Sigma_i (P_i'+\pi)/(T\Delta_i\delta) < B \qquad (D)$$

If accepting a new connection would violate either of these two inequalities, the connection is blocked.

F. Multiple Channels

It should be noted that in the case of multiple upstream and downstream channels, polling table 600 of FIG. 6 and hub polling apparatus 700 of FIG. 7 are replicated at the hub for each channel in the system.

However, modulator 816 and demodulator 802 of FIG. 8 are made tunable over the range of available channels in the system.

In addition, the hub assigns channels to user stations. In the exemplary embodiment of the present invention, each user station has home channels (which can be different for different users) to which modulator 816 and demodulator 802 in its set-top box are tuned when the user station is idle. When the user becomes active, it is assigned, by the hub, a downstream channel to which demodulator 802 is tuned and an upstream channel to which modulator 816 is tuned. Therefore, the hub knows which channel to send the polls on for every user in the system.

G. Theory of Operation

Figure 1:
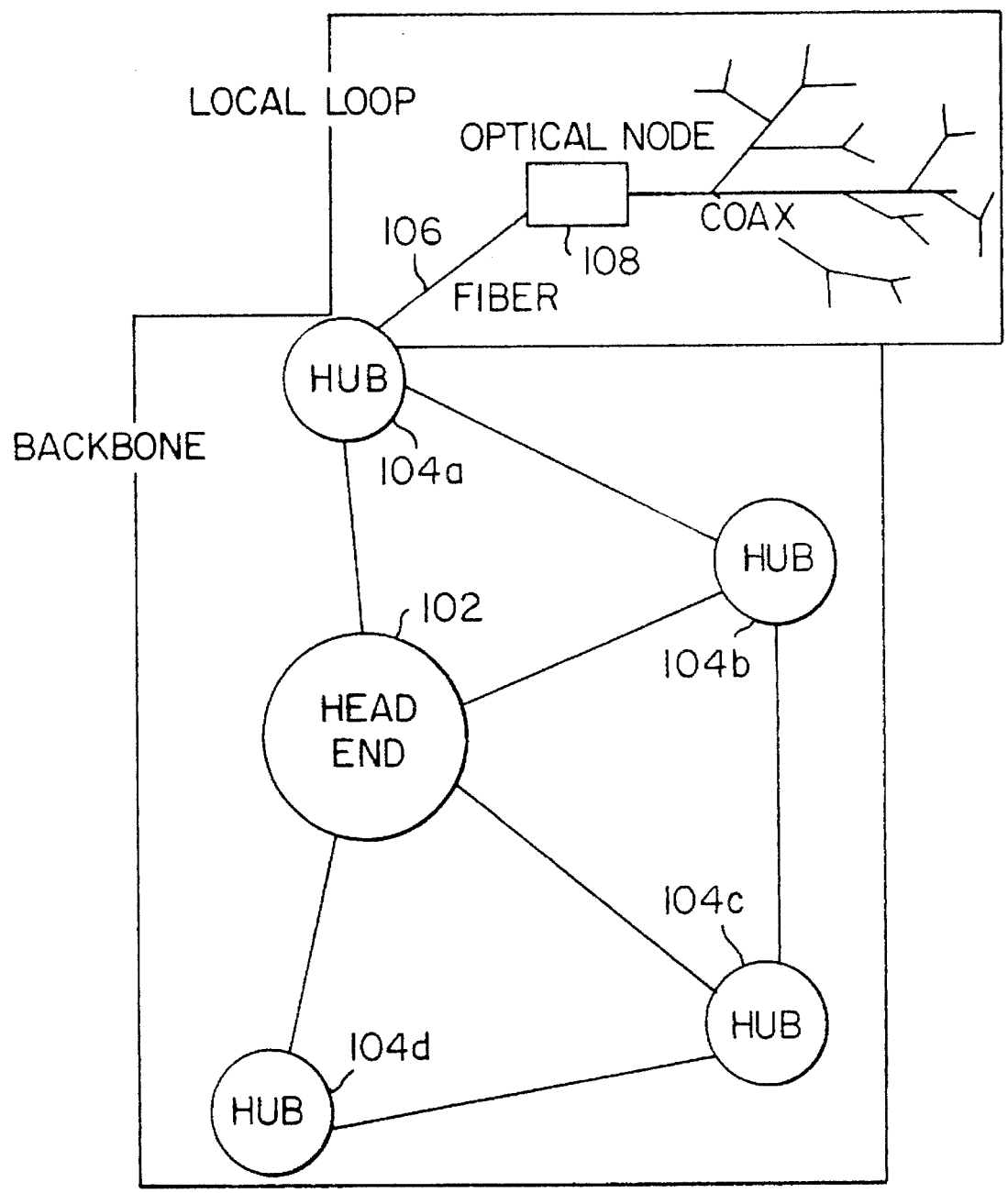
FIG. 1 is a representation of a CATV analog network structure.

Assuming, as shown in FIG. 1, the CATV network is configured with a tree topology, it follows that there is a unique path in the tree from any node to any other node and, in particular, from the users to the hub. As a result, the hub receives only one copy of any user's transmission.

It is assumed that all transmissions propagate on the coax with the same speed and have finite durations (possibly different for different transmissions). Two transmissions are said to collide at a point of the tree if parts of both transmissions are at that point at the same time.

Given the above assumptions, it is observed that:

If the transmissions originating from two users do not collide at the hub, they do not collide anywhere on their paths to the hub.

Let $s_i$ be the polling sequence, i.e., the users are polled by the hub in the order $s_0, s_1, \ldots$. Let the time of generation of the poll to user $s_i$ be $t_i$ (the timestamps) and let the response of user $s_i$ start to be received at the hub at the instant $t_i'$ and be of size $p_i$. Thus, this response is received by the hub during the interval $[t_i', t_i'+p_i)$. In order to ensure that these responses do not overlap at the hub (and therefore, by the above observation, anywhere else on the coax tree), $t_i'$ should be chosen such that these intervals are disjoint, i.e., such that $$t_{i+1}' \geq t_i' + p_i \text{ for all } i. \tag{C}$$

Furthermore, if $t_{i+1}' = t_i' + p_i$ there is no dead-time between responses. This is illustrated in FIG. 4b.

Suppose the times at which polls are generated are such that $$t_{i+1} \geq t_i + p_i \text{ for all } i.$$

In this case, the design of the polling procedure is such that the time between the generation of this poll at the hub and the time the response to this poll is received by the hub $(t_i' - t_i)$ is a constant, D, independent of the user the poll is sent to. The way this is accomplished is by having each user delay its response to the poll by a specified amount $D_i$. If $\Pi_i$ denotes the round-trip propagation delay to user i, at the time of poll generation $D_i$ is set equal to $D - \Pi_i$.

Referring back to FIGS. 7 and 8, at the head of poll-FIFO 708 at the hub, the delay incurred in the FIFO is subtracted from $D_i$ and similarly at the set-top box so that the net elapsed time between poll generation and reception of the response remains constant, at D. This is illustrated in FIG. 4c.

The situation, however, becomes complicated by the fact that poll i+1 can be generated before the recipients of the previous polls have had sufficient time to respond, e.g., if $t_{i+1} < t_i + p_i$. In this case, the delay field of poll i+1 is increased in order to ensure that the responses do not overlap.

In general, denote the amount by which the delay field should be increased for poll k by $a_k$. Then, $a_k$ should satisfy $$t_{k+1} + a_{k+1} \geq t_k + a_k + p_k \text{ for all } k,$$

in order to satisfy inequality (C).

Furthermore, in order to minimize the dead-time between responses, the slack in this inequality should be minimized, i.e., the minimum (non-negative) value of $a_k$ that satisfies this inequality should be chosen.

Although the invention is illustrated and described herein embodied as a method and system for a multiple access polling protocol for interactive communication with respect to a CATV network, the invention is nevertheless not intended to be limited to the details as shown. Rather, various modifications may be made in the details within the scope and range of equivalents of the claims and without departing from the spirit of the invention.

What is claimed:

1. A polling method for providing efficient access to a shared communications medium by minimizing collisions and idle time for a plurality of interactive user stations coupled to a remote station which transmits polling signals, each user station having individual bandwidth requirements, the method comprising the steps of:

establishing connections between the remote station and user stations;

assigning to each user station, upon connection, a definite and respective polling rate, polling rate being defined as the number of polls per unit time received by a user station;

assigning to each user station, upon connection, a definite and respective response size;

assigning to each user station a respective delay;

transmitting a polling signal from the remote station to each user station at the respective assigned polling rates; and transmitting a response from each user station no greater in size than the respective response sizes, the step of transmitting a response from the user station to the remote station occurring in response to said polling signal but after said respective delay of time.

2. A polling method in accordance with claim 1, wherein the individual bandwidth requirements of the user stations are communicated by transmitting a request for modification from a user station to the remote station which indicates the bandwidth requirements for the user station.

3. A polling method in accordance with claim 2, further comprising the step of modifying, in accordance with the individual bandwidth requirements of the user stations, at least one of the respective polling rates or the respective response sizes for the user stations; and continuing communication between the remote station and the user stations with the modified polling rates and response sizes.

4. A polling method in accordance with claim 1, wherein the user station delay is related to the response sizes assigned to user stations which are polled prior in order to the concerned user station.

5. A polling method in accordance with claim 1, wherein the user station delay is related to a propagation delay incurred by the data when transmitted from the respective user station to the remote station.

6. A polling system for providing efficient access to a shared communications medium by minimizing collisions and idle time for a plurality of interactive user stations coupled to a remote station which transmits polling signals, each user station having individual bandwidth requirements, comprising:

means for establishing connections between the remote station and user stations;

means for assigning to each user station, upon connection, a definite and respective polling rate and a definite and respective response size;

means for assigning to each user station a respective delay;

means for transmitting a polling signal from the remote station to each user station at the respective assigned polling rates; and means for transmitting a response from each user station no greater in size than the respective response sizes, the transmission from the concerned user station to the remote station occurring in response to said polling signal but after said respective delay of time.

7. A polling system in accordance with claim 6, wherein the individual bandwidth requirements are communicated by a means for transmitting a request for a modification from a user station to the remote station which indicates the bandwidth requirements for the user station.

8. A polling system in accordance with claim 7, further comprising means for modifying, in accordance with the individual bandwidth requirements of the user stations, at least one of the respective polling rates or the respective response sizes for the user stations.

9. A polling system in accordance with claim 6, wherein the user station delay is related to the response sizes assigned to user stations polled prior in order to the concerned user station.

10. A polling system in accordance with claim 6, wherein the user station delay is related to a propagation delay incurred by the data when transmitted from the respective user station to the remote station.

11. A polling system in accordance with claim 6, wherein the response is in the form of a packet of data.

12. A polling method in accordance with claim 1, wherein the response is in the form of a packet of data.

* * * * *

UNITED STATES PATENT AND TRADEMARK OFFICE
CERTIFICATE OF CORRECTION

PATENT NO. : 5,539,882
DATED : July 23, 1996
INVENTOR(S) : Inder S. Gopal, et. al.

It is certified that error appears in the above-identified patent and that said Letters Patent is hereby corrected as shown below:

Title page, item [63], Related U.S. Application Data, after abandoned, should read which is a continuation-in-Part of Ser. No. 992,227, Dec. 16, 1992, now Patent No. 5,367,517.

Signed and Sealed this

Tenth Day of March, 1998

Attest:

BRUCE LEHMAN

*Attesting Officer*  *Commissioner of Patents and Trademarks*